(12) United States Patent
Canella et al.

(10) Patent No.: US 7,046,797 B2
(45) Date of Patent: May 16, 2006

(54) TELEPHONE SYSTEM WITH CONTROLLABLE RINGING VOLTAGE

(75) Inventors: Alberto Canella, Villach (AT); Gerhard Noessing, Villach (AT)

(73) Assignee: Infineon Technologies AG, Munich (DE)

( * ) Notice: Subject to any disclaimer, the term of this patent is extended or adjusted under 35 U.S.C. 154(b) by 505 days.

(21) Appl. No.: 10/218,987

(22) Filed: Aug. 14, 2002

(65) Prior Publication Data

US 2003/0064760 A1    Apr. 3, 2003

(30) Foreign Application Priority Data

Aug. 17, 2001    (DE)    ................. 101 40 357

(51) Int. Cl.
*H04M 1/00*    (2006.01)
(52) U.S. Cl. .................. 379/413.01; 379/418; 379/252
(58) Field of Classification Search ........... 379/413.01, 379/418, 252
See application file for complete search history.

(56) References Cited

U.S. PATENT DOCUMENTS

| 5,600,713 | A  | * | 2/1997  | Chen    | ........................... 379/418  |
| 5,926,544 | A  |   | 7/1999  | Zhou    | ........................... 379/413  |
| 6,813,340 | B1 | * | 11/2004 | Issaa et al. | ............ 379/399.01 |
| 2001/0006549 | A1 |   | 7/2001  | Harasaki et al. | ....... 379/373.03 |

FOREIGN PATENT DOCUMENTS

| DE |    3926149    | 2/1990 |
| EP | DE 0829998    | 3/1998 |
| EP | DE 1017220    | 7/2000 |
| EP | DE 1093286    | 4/2001 |
| WO | WO 99/26348   | 5/1999 |
| WO | WO 99/27703   | 6/1999 |

* cited by examiner

*Primary Examiner*—Jefferey F. Harold
(74) *Attorney, Agent, or Firm*—Fish & Richardson P.C.

(57) ABSTRACT

A telephone system includes a controllable ringing generator for generating a ringing signal and an interface for providing a ringing voltage derived from that signal on the transmission line. The controllable ringing generator includes a control device for controlling the ringing voltage in response to the ringing current.

8 Claims, 2 Drawing Sheets

TELEPHONE SYSTEM WITH CONTROLLABLE RINGING VOLTAGE

FIELD OF INVENTION

The invention relates to telephone systems, and in particular, to generating ringing voltages in such systems.

RELATED APPLICATIONS

This application claims the Aug. 17, 2001 priority date of German patent application 101 40 357.7, the contents of which are herein incorporated by reference.

BACKGROUND

When calling a subscriber in a telephone system, as is known, a ringing signal sounds which is generally generated at a central location (the exchange). For this purpose, telephone systems comprise ringing generators for generating a ringing voltage which is output after amplification by an SLIC (Subscriber Line Interface Circuit) onto the transmission line.

In this case, the ringing voltage output by the SLIC must satisfy certain requirements specified e.g. in the reference: Telcordia (Bellcore) Technical Reference TR NWT 000057 for DLC systems. In accordance with TR NWT 57, a ringing voltage of at least 40 Vrms must be present across a maximum permitted ringing load of five REN (Ringer Equivalent Number), that is to say a maximum of five telephones connected in parallel, given a maximum line length [sic] of 930 ohms. In this case, the SLIC would have to supply a ringing voltage of approximately 70 Vrms and a current of approximately 29 mA would flow. By contrast, if the load is present directly at the exchange, that is to say the transmission line is short and only has a resistance of 400 ohms, for example, it is not necessary to feed a ringing voltage of 70 Vrms into the line in order to satisfy the minimum requirement of 40 Vrms across the load. A ringing voltage of about 43 Vrms fed in by the SLIC would be sufficient in this case. If 70 Vrms are nevertheless fed in, a current of about 47 mA flows. Thus, approximately 60% more current flows than would be necessary for the five REN, with correspondingly more power being consumed.

In battery-fed applications or applications which must still maintain the telephone service during a mains voltage failure (life support systems) and utilize batteries for this purpose, such as, for example, ISDN NTs (network terminations) or DLC (digital loop carrier) systems, a high power loss is disadvantageous.

It is known to use external ringing generators, i.e. ringing generators arranged outside a CODEC (coder-decoder), which supply a plurality of transmission lines with a ringing signal and switch the ringing signal to a desired line via relays. In order to keep the current as small as possible with short transmission lines, different resistors are connected downstream of the ringing generators, depending on the length of the transmission line. However, as a result of this measure, the no-load voltage is considerably increased and the power loss rises accordingly.

SUMMARY

Therefore, the object of the present invention is to lower the power loss in the ringing mode.

The essential concept of the invention consists in controlling the ringing voltage output by an SLIC in a manner dependent on the load to be driven, which load is essentially determined by the length of the transmission line. For this purpose, provision is made of a controllable ringing generator with a control device for controlling the ringing voltage output by the SLIC.

In order to determine the length of the transmission line, the current flowing on the transmission line in the ringing mode (during ringing) is preferably measured. The measured current value is a measure of the length of the transmission line and serves as a manipulated variable for the control device.

In accordance with a preferred embodiment of the invention, the controllable ringing generator comprises a ringing generator for generating a ringing signal with a constant amplitude (constant ringing generator).

In accordance with one refinement of the invention, the control device generates, in a manner dependent on the measured current value, a multiplication factor by which the ringing signal of the constant ringing generator is multiplied.

In order to evaluate the measured current value, provision may be made of a rectifier and integration circuit, by means of which the current measurement signal supplied by the measuring device is rectified and integrated. The integration of the current measurement signal is preferably effected over a period of the ringing signal.

In accordance with a preferred embodiment of the invention, provision is made of a device for determining a zero crossing of the ringing signal, in order to determine the integration duration.

The controllable ringing generator is preferably programmable. The ringing voltage for a lower current threshold value and an upper current threshold value may preferably be set in the control device of the ringing generator. The control device can thus be set in a simple manner to different standards and therefore to different minimum preconditions for the ringing voltage.

If a current which is less than the lower current threshold value flows on the transmission line in the ringing mode, then the ringing voltage output by the SLIC is preferably controlled to a constant maximum value. By contrast, if a current which is greater than the upper current threshold value flows in the ringing mode, then the ringing voltage output by the SLIC is preferably set to a constant minimum value.

In accordance with a preferred embodiment of the invention, the measuring device for measuring the current carried on the line is arranged in the SLIC.

The CODEC of the telephone system preferably comprises a device for generating a DC offset for off-hook identification (i.e. for identifying whether the telephone receiver has been taken off-hook).

The solution described above additionally has the advantage that only the AC ringing voltage and not the DC voltage is reduced, as a result of which the off-hook identification is not influenced.

BRIEF DESCRIPTION OF THE FIGURES

The invention is explained in more detail below by way of example with reference to the accompanying drawings, in which.

DETAILED DESCRIPTION

Figure 1:
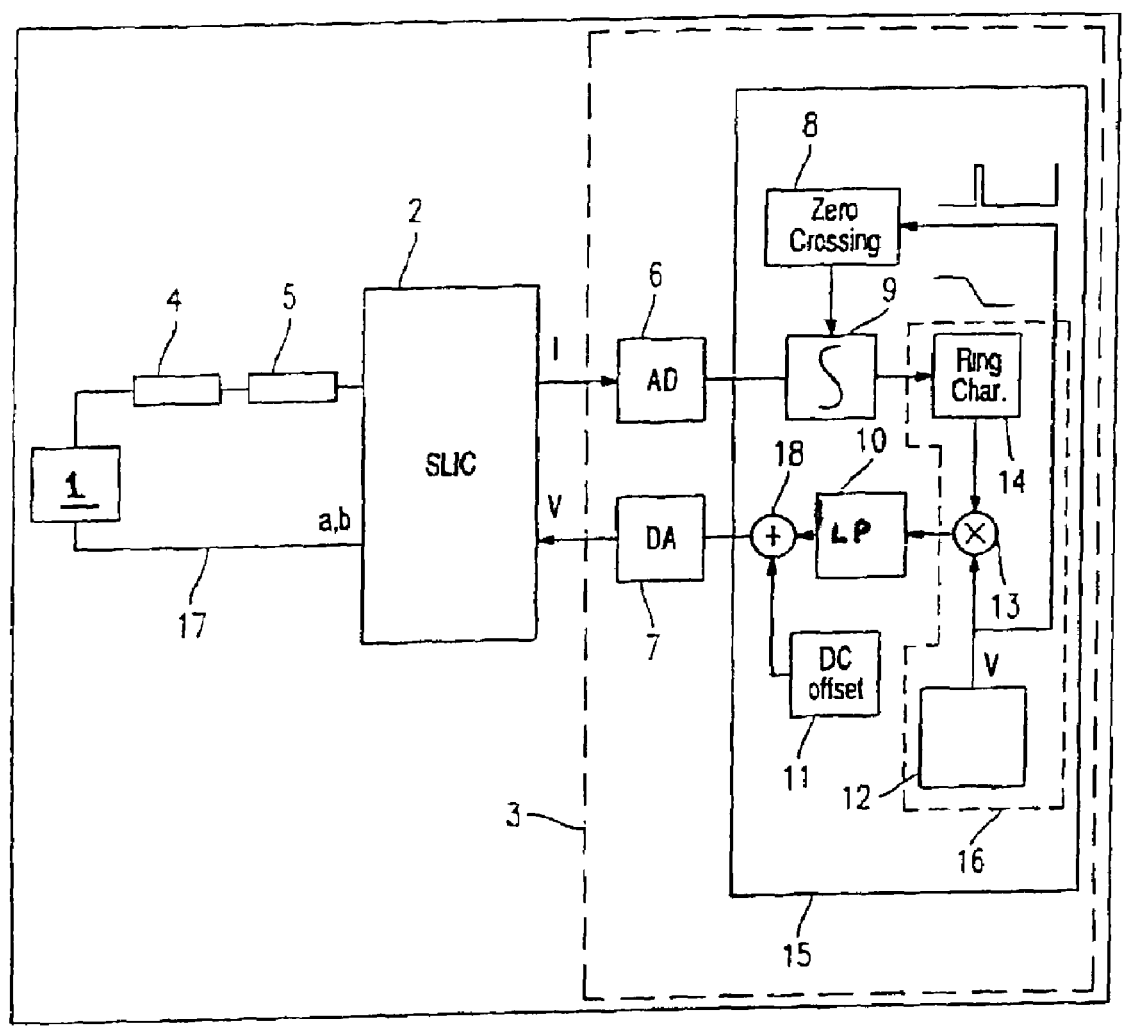
FIG. 1 shows an exemplary embodiment of a telephone system with controlled ringing voltage according to the invention.

FIG. 1 shows a detail from a telephone system with a telephone 1 of a network subscriber and a CODEC (coder/de-coder), which is usually arranged in an exchange. The interface between CODEC 3 and telephone 1 is formed by an SLIC 2 (subscriber line interface circuit), which outputs not only audio signals but also a ringing signal to the telephone 1. The signals are transmitted via the transmission line 17 between SLIC 2 and telephone 1.

In order to generate ringing signals a controllable ringing generator 16 is provided, which comprises a constant ringing generator 12 for generating an AC voltage with a constant amplitude and also a control device 14. The controllable ringing generator 16 is arranged in the CODEC DSP (digital signal processor) 15.

Furthermore, a low-pass filter 10 is provided, which filters the ringing signal in order to suppress disturbances. For hook identification (identifying whether the telephone receiver of the telephone 1 has been placed on-hook or taken off-hook), a DC component (DC offset) generated by a corresponding device DC offset 11 is also added to the ringing signal at the addition node 18.

The resulting signal is subjected to analog conversion by means of a DA converter 7 and output to the SLIC 2, which amplifies the ringing voltage and outputs it onto the transmission line 17.

The total load to be driven essentially results from the impedance of the telephone 1, the resistor 4 of the transmission line 17 and resistors 5 which are arranged for protection against overload, e.g. due to a flash of lightning, in the transmission line 17.

In order to determine the length or the resistance of the transmission line 17, a measuring device is arranged in the SLIC 2, and continuously measures the current carried on the transmission line 17. The measured current value is fed to an AD converter 6 and a rectifier and integration circuit 9 connected thereto, which circuit integrates the rectified signal.

The integration is best effected over a period of the ringing signal generated by the constant ringing generator 12. In order to determine the integration period, there is arranged a device 8 for identifying zero crossings of the ringing signal, which device is connected to the constant ringing generator 12 and the rectifier and integration circuit 9.

The measured current value output by the rectifier and integration circuit 9 can then be averaged over a plurality of values or be subjected to low-pass filtering by means of corresponding devices (not shown).

The measured current value is finally fed to the control device 14, which controls the ringing voltage Va, b (desired variable) output by the SLIC 2 to a predetermined value in a manner dependent on the measured current value. For this purpose, the control device 14 generates multiplication factors by which the ringing signal generated by the constant ringing generator 12 is multiplied at the multiplication node 13.

Figure 2:
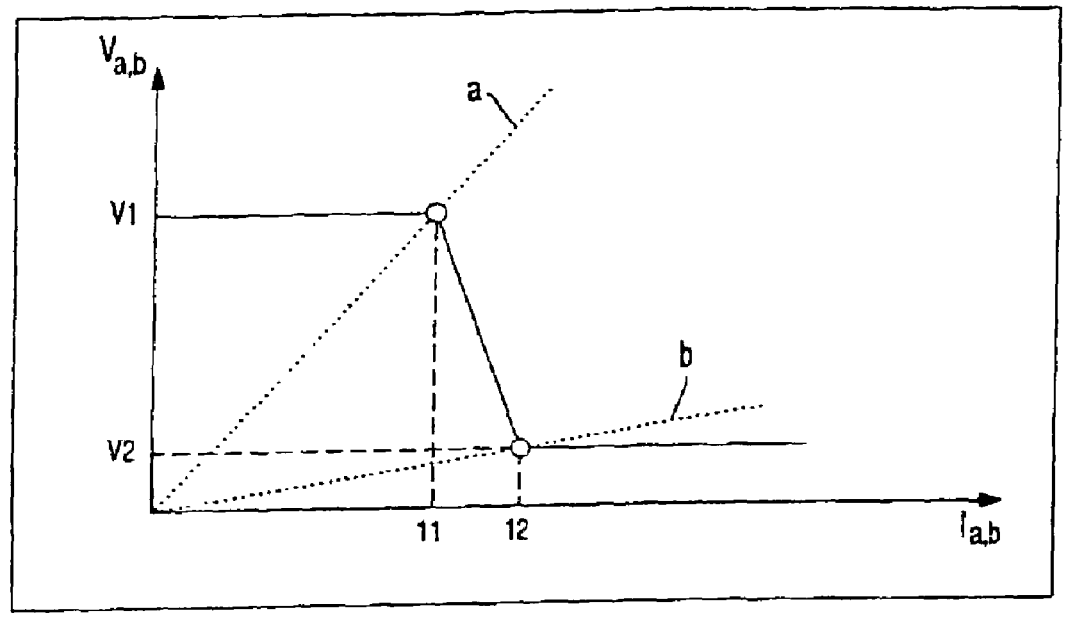
FIG. 2 shows the profile of the ringing voltage in the telephone system from FIG. 1 as a function of the current flow.

FIG. 2 shows the profile of the ringing voltage Va, b output by the SLIC 2 for different line lengths of the transmission line 17. In this case, the dotted line a represents the total load for the maximum permissible line length and the line b represents the total load for a very short line length.

The ringing voltage Va, b is controlled linearly in a region between a lower current threshold value I1 (longest line length) and an upper current threshold value I2 (shortest line length). If the current measurement yields a current flow of less than I1 (e.g. 30 mA), then a constant maximum voltage V1 (e.g. 70 Vrms) is output. If the current measurement yields a current flow of more than I2 (e.g. 90 mA), then a constant minimum voltage V2 (e.g. 45 Vrms) is output. The minimum voltage V2 preferably lies at a value just above the required minimum ringing voltage at the telephone (e.g. 40 Vrms). This ensures that the minimum ringing voltage prescribed by the respective standard is present at the telephone 1.

The resistance defined by the gradient of the straight lines between the values I1, V1 and I2, V2 could also be realized as a real resistance. In the case of the illustrated resistance of about 5 kohms, however, a no-load voltage of approximately 220 V would result, which is not possible for an IC ringing generator. A smaller resistance of e.g. 1 kohm would be possible with regard to the no-load voltage, but would result in a smaller control range.

The controllable ringing generator 16 is additionally programmable, so that a user only has to select the minimum and maximum voltages (V1, V2) and the corresponding currents (I1, I2) in order to adapt the control to predetermined requirements.

Figure 3:
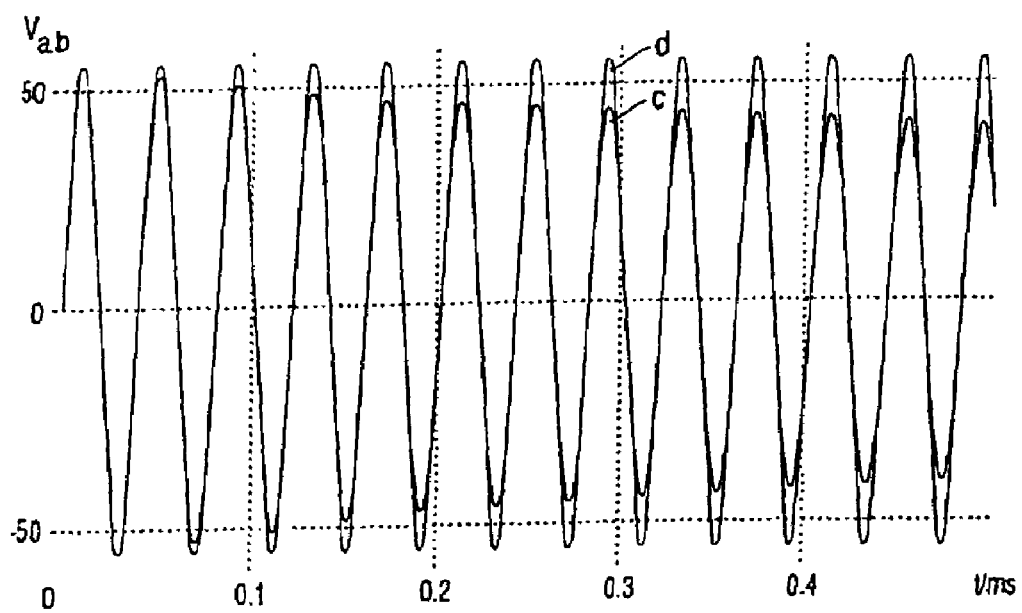
FIG. 3 shows the profile of the ringing voltage with or without control.

FIG. 3 shows the temporal profile of the ringing voltage with control (curve c) and without control (curve d). As can be discerned, the amplitude of the ringing voltage Va, b is already reduced to the final, lower value after about 0.2 s as a result of which the power loss is correspondingly reduced.

The invention claimed is:

1. A telephone system comprising
   a controllable ringing generator for generating a ringing signal, the ringing generator having a control device for controlling a ringing voltage derived from the ringing signal in response to a ringing current;
   an interface for providing the ringing voltage derived from the ringing signal onto a transmission line;
   a measurement device in electrical communication with the transmission line, the measurement device being configured to obtain a measurement signal indicative of the ringing current on the transmission line and to provide that measurement signal to the controllable ringing generator; and
   wherein the controllable ringing generator further comprises a circuit configured to rectify and to integrate the measurement signal.

2. The telephone system of claim 1, wherein the circuit is configured to integrate the measurement signal over an integral number of periods of the ringing voltage.

3. The telephone system of claim 1, wherein the measurement device is arranged within a SLIC.

4. A telephone system comprising:
   a controllable ringing generator for generating a ringing signal, the ringing generator including
      a control device for controlling a ringing voltage derived from the ringing signal in response to a ringing current,
      a constant ringing generator, and
      a zero-crossing determination device in communication with the constant ringing generator, the zero-crossing determination device being configured to determine a zero crossing of the ringing signal generated by the constant ringing generator the control device and the constant ringing generator being configured to provide a ringing signal of constant amplitude on a transmission line; and an interface for providing the ringing voltage derived from the ringing signal onto the transmission line.

5. The telephone system of claim 4, wherein the control device is configure to generate a multiplier for multiplying a ringing signal provided by the constant ringing generator.

6. A telephone system comprising:

a controllable ringing generator for generating a ringing signal, the ringing generator having a programmable control device for controlling a ringing voltage derived from the ringing signal in response to a ringing current, the programmable control device being configured to receive, as input, a ringing voltage for a lower current threshold value, and a ringing voltage for an upper current threshold value; and to set a constant maximum ringing voltage when the current flow is less than the lower current threshold value; and an interface for providing the ringing voltage derived from the ringing signal onto a transmission line.

7. A telephone system comprising:

a controllable ringing generator for generating a ringing signal, the ringing generator having a programmable control device for controlling a ringing voltage derived from the ringing signal in response to a ringing current, the programmable control device being configured to receive, as input, a ringing voltage for a lower current threshold value, and a ringing voltage for an upper current threshold value, and to set a constant minimum ringing voltage when the current flow is greater than the upper current threshold value and an interface for providing the ringing voltage derived from the ringing signal onto a transmission line.

8. A telephone system comprising:

a DC offset controllable ringing generator for generating a ringing sianal, the ringing generator having a control device for controlling a ringing voltaae derived from the ringing signal in response to a ringing current; and an interface for providing the ringing voltage derived from the ringing signal onto a transmission line.

* * * * *